United States Patent [19]

Schowalter

[11] 3,994,348
[45] Nov. 30, 1976

[54] DRAFT CONTROL SYSTEM ON A VEHICLE INCLUDING SENSING MECHANISM THEREFOR

[75] Inventor: Lewis G. Schowalter, Racine, Wis.

[73] Assignee: J. I. Case Company, Racine, Wis.

[22] Filed: Mar. 10, 1975

[21] Appl. No.: 556,587

[52] U.S. Cl. .................................. 172/9; 336/136
[51] Int. Cl.² .................................. A01B 63/112
[58] Field of Search ................ 172/1, 2, 3, 4, 4.5, 172/6, 7, 9; 336/30, 130, 136; 323/51; 340/199

[56] References Cited
UNITED STATES PATENTS

| | | | |
|---|---|---|---|
| 2,099,100 | 11/1937 | Bond | 336/30 X |
| 2,411,891 | 12/1946 | Owens | 336/136 X |
| 2,417,097 | 3/1947 | Warshaw | 336/136 X |
| 2,756,385 | 7/1956 | Mathews | 336/130 X |
| 2,881,402 | 4/1959 | Walker | 336/136 |
| 3,122,970 | 3/1964 | Rhoades | 336/30 X |
| 3,210,746 | 10/1965 | Clapp | 340/199 |
| 3,313,877 | 4/1967 | Boenning | 336/136 X |
| 3,516,498 | 6/1970 | Schowalter | 172/9 |
| 3,658,133 | 4/1972 | Sweet et al. | 172/4 |
| 3,831,683 | 8/1974 | Ikeda et al. | 172/4.5 |
| 3,860,074 | 1/1975 | Maistrelli | 172/7 |

FOREIGN PATENTS OR APPLICATIONS 537,007   2/1957   Canada ........................ 340/199

Primary Examiner—Richard T. Stouffer
Attorney, Agent, or Firm—Dressler, Goldsmith, Clement Gordon & Shore, Ltd.

[57] ABSTRACT

The sensing system disclosed herein is adapted to control the position and/or draft of an implement connected to a vehicle through draft arms that are positioned by a rock shaft. The setting of the rock shaft is accomplished by a hydraulic motor having fluid supplied thereto by a control valve and the desired setting is made by a manual control lever. The control lever, rock shaft and draft arms have sensing devices associated therewith, each of which includes a variable inductance coil fixed on the vehicle and a plunger movable with respect to the coil. Each sensing device has a continuous output which is the function of the position of the member associated therewith.

7 Claims, 2 Drawing Figures

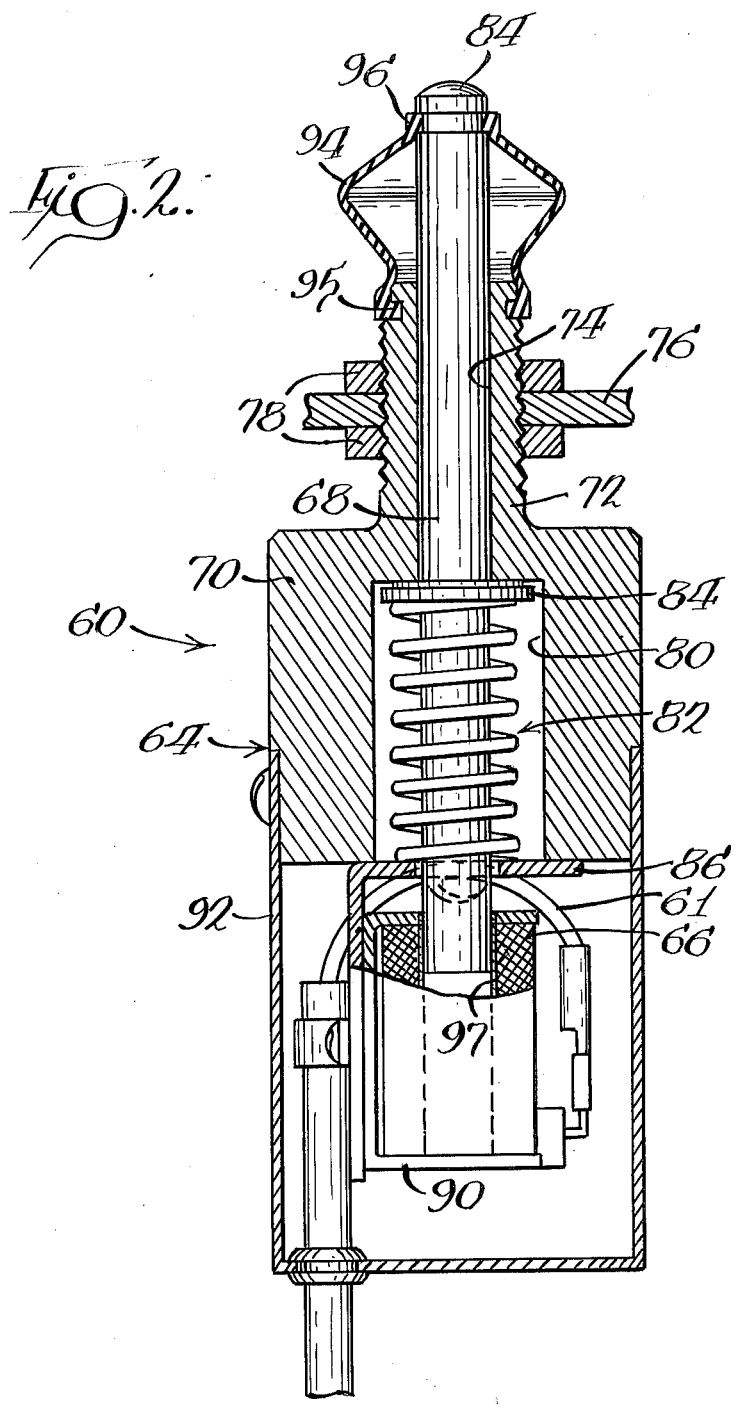

DRAFT CONTROL SYSTEM ON A VEHICLE INCLUDING SENSING MECHANISM THEREFOR

BACKGROUND OF THE INVENTION

The present invention relates to an improved sensing device for use in an electronic draft control system of the type disclosed in L. G. Schowalter U.S. Pat. No. 3,516,498, issued June 23, 1970 and assigned to the assignee of the present invention.

One of the most common present day systems for connecting an implement to a tractor is known as a three-point hitch. The three-point hitch consists of a pair of draft arms that provide the connection between the implement and the tractor and a rock arm connected to a rock shaft and also to the draft arms through links. The rock shaft is positioned by a hydraulic motor. Fluid is selectively admitted to the hydraulic motor through a valve which is actuated in response to changes in the draft forces on the draft arms, the manual positional setting of the system and the position of the rock shaft. Heretofore, most of the systems that are commercially available consist of a strictly mechanical sensing system for sensing changes in draft load, the position of the rock shaft and the position of a manual control lever. These mechanical systems become extremely complicated and require a substantial amount of maintenance.

As such, many recent efforts have been directed toward development of an electronic system for controlling the hydraulic valve which supplies fluid to the hydraulic motor. Examples of such devices are shown in U.S. Pat. No. 3,814,188, issued on June 4, 1974, as well as the above mentioned Schowalter patent.

So far as presently known, most systems that have been proposed rely primarily upon signal amplification for measuring changes in the various parameters of the system. In other words, a signal is developed from the various sensing devices, and the signals are combined and amplified to produce an output signal. When the combined output signal exceeds a certain level, a control valve is actuated to make a correction. However, these systems have lacked reliability because presently known sensing devices do not have the requisite sensitivity to measure small changes in the respective parameters.

One of the problems encountered with the development of a completely electronic control system for controlling the position of draft arms of an implement deals with the sensing device that is utilized for sensing the changes in position of the various components in the system. It will be appreciated that in order to have a reliable system, the sensing device must be extremely durable in order to be capable of absorbing the vibrations that are developed in the vehicle and the implement and yet be sensitive enough to be able to sense changes of small magnitude.

SUMMARY OF THE INVENTION

According to the present invention, an extremely reliable sensing device has been developed which can readily be incorporated into a totally electronic draft sensing system for a vehicle and an implement connected thereto. The sensing devices each produce a continuous signal which is varied when there are changes in either the draft load, the position of the implement or the position of the manual control lever. The unique sensing device is incorporated as part of a draft sensing system between a vehicle and an implement supported on the vehicle by draft arms.

In the specific system, the draft arms are movable with respect to the vehicle in response to changes in draft load on the implement and the arms are positioned by a rock shaft that is supported on the vehicle. The rock shaft is positioned by a fluid motor which has fluid supplied thereto by a fluid valve and a control lever forms part of the system. The rock shaft and the draft arms have members that are movable therewith for indicating the position of the draft arms and the rock shaft and sensing devices cooperate with each member. In addition, the manual control lever has a third member cooperating therewith with a third sensing device cooperating with the member. The signals of the three sensing devices are combined by an electronic control circuit which produces a control signal that operates the valve.

Each sensing device includes a variable inductance coil that is supported in a housing fixed on the vehicle and a plunger is movable with respect to the coil and is biased into engagement with the associated member so that the plunger is moved in response to movement of the associated member.

BRIEF DESCRIPTION OF THE SEVERAL VIEWS OF THE DRAWINGS

FIG. 2 is an enlarged cross-sectional view of the sensing device of the present invention.

DETAILED DESCRIPTION

Figure 1:
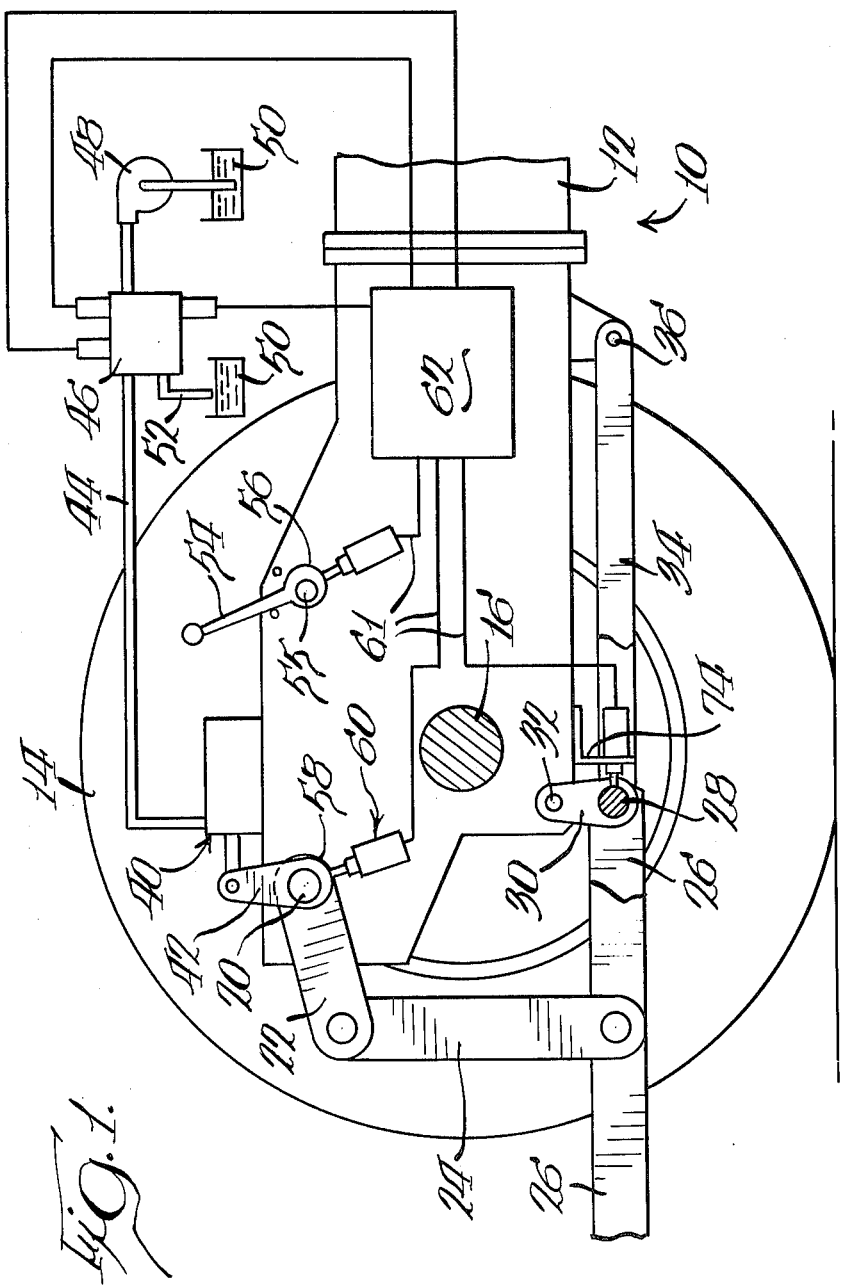
FIG. 1 schematically illustrates a portion of a vehicle and a draft sensing mechanism.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings schematically illustrates a portion of a conventional tractor or vehicle 10 including a housing 12 supported on rear wheels 14 that are connected to opposite ends of a rear axle 16. A rock shaft 20 extends generally parallel to axle 16 and is rotatably supported on housing 12 that forms part of vehicle 10. Rock shaft 20 has a pair of rock arms 22 (only one being shown) fixed thereto and each rock arm is connected through a link 24 to a draft arm or link 26. An earthworking implement (not shown) is attached to the rear ends of the two draft arms while the forward ends are interconnected by a cross shaft or member 28. Cross shaft or member 28 is supported for movement with respect to vehicle 10 by a pair of transversely spaced links 30 (only one being shown) pivotally supported on vehicle 10 by pins 32. A spring mechanism or biasing mechanism 34 has one end secured to member or cross shaft 28 while the opposite end is connected to vehicle 10 by a pin 36. Biasing mechanism 34 is preferably of the type disclosed in Engelmann U.S. Pat. No. 3,375,876, assigned to the assignee of the present invention. Biasing mechanism 34 normally biases member 28 to a forward most position and accommodates rearward movement of member 28 as the draft load on the implement increases.

The position of rock shaft 20 is controlled by a hydraulic motor 40 connected to rock shaft 20 by an arm 42. Hydraulic fluid is supplied to motor 40 through a conduit 44 connected to a control valve 46 which has pressurized fluid supplied thereto by pump means 48 drawing fluid from a reservoir 50. Reservoir 50 is also connected to control valve 46 through a further conduit 52. Thus, pressurized fluid may be supplied to one end of hydraulic motor or ram 40 by actuation of the control valve 46. Alternatively fluid may be forced from hydraulic ram to the reservoir when the control valve is actuated. The fluid is forced from the ram by the weight of the implement.

The draft sensing system also incorporates a manual control lever 54 which is pivotally supported on vehicle 10 to set the desired position and/or draft load on the vehicle through circuitry that will be subsequently described. Control lever 54 has a member movable therewith for indicating the position of the control lever with respect to vehicle 10. In the illustrated embodiment, the movable member consists of a camming surface 56 that is eccentric with respect to the axis of pin 55 which supports control lever 54. Also, rock shaft 20 likewise has a camming surface 58 that is eccentric to the axis of the rock shaft and defines a member that is movable therewith to define the position of the rock shaft with respect to the vehicle.

According to the present invention, the positions of the rock shaft 20, draft arms 26 and control lever 54 with respect to vehicle 10 are all sensed by unique sensing devices which are identical in construction to each other. The sensing devices are part of an electronic control circuit 62 which produces continuous positive output signals that are fed by lines 61 through the sensing devices. The sensing devices vary these output signals as a function of changes and the electronic control circuit produces a control signal that actuates control valve 46.

Electronic control circuit 62 is preferably of the type disclosed in a co-pending application of Robert M. Haney Ser. No. 556,531, filed March 10, 1975 and actuates control valve 46 through lines 63. Also, control valve 46 is preferably solenoid operated and is of the type disclosed in my co-pending application Ser. No. 556,589, filed Mar. 10, 1975.

Each sensing device 60 is identical in construction and only one will be described in detail with particular reference to FIG. 2 of the drawings. Sensing device 60 consists of a housing 64 which supports a variable inductance coil 66 and a plunger 68 that is movable with respect to coil 66. More specifically, housing 64 includes a rigid main body portion 70 that has a threaded sleeve 72 extending from one end thereof with sleeve 72 having an opening 74. Main body portion 70 of housing 68 is fixed with respect to vehicle 10 by an L-shaped bracket 76 (FIG. 1) and a pair of lock nuts 78 so that housing 64 is rigidly affixed with respect to vehicle 10 but may readily be adjusted by moving the entire unit axially of plunger 68.

Body portion 70 of housing 64 also has an enlarged bore 80 aligned with opening 74 with plunger 68 extending through bore 80 and opening 74. Biasing means 82, located within bore 80, normally biases the outer free end 84 of plunger 68 into engagement with a member, such as member 28, as will be described later.

Biasing means or coil spring 82 is interposed between a washer 84 carried by an intermediate portion of plunger 68 and a bracket 86 extending across a free end of counterbore 80. Bracket 86 is secured to body portion 70 and has a U-shaped support member 90 secured thereto with coil 66 supported by member 90. Housing 64 preferably also has a removable cap 92 to substantially close and seal one end of body portion 70 while the opposite end is sealed by a resilient cover 94. Resilient cover is shown as including a flange portion 95 at one end that is received in an annular groove at the outer end of sleeve 72. Flange portion 95 and the annular groove define a first connection between the cover and the housing. The opposite end of cover 94 which surrounds the exposed portion of plunger 68 has an additional flange 96 received in an annular groove adjacent the end of the plunger and flange 96 defines a second connection.

An inspection of FIG. 2 shows that the inner end of plunger 68 is received into a center opening 97 of the annular variable inductance coil 66 and is biased to the extreme position illustrated in FIG. 2 by coil spring 82.

In the installation of the respective sensing devices 60, the devices are positioned so that plunger 68 is in an intermediate position with respect to housing 64 and is held in engagement with an associated member by the bias of spring 82.

Considering now the operation of the draft sensing system having the unique sensing devices incorporated therein, manual control lever is initially rotated to produce a desired setting of the draft arms with respect to the vehicle. Movement of control lever 54 will move camming surface 56 and cause an axial shifting of plunger 68 with respect to variable inductance coil 66 to change the output signal which is fed to control circuit 62 through line 61. This signal is translated and actuates control valve 46 and produces a desired setting of draft arms 26 by rotating rock shaft 20. As rock shaft 20 is rotated, a plunger associated therewith moves with respect to coil 66 and at the same time the plunger 68 of the sensing device 60 associated with draft arms 26 is moved with respect to its associated coil 66. The variations in the outputs which are produced by the relative movements of the plungers and the associated coils are fed through lines 61 to control circuit 62. When the desired setting of the draft arms have been reached, the control circuit 62 will neutralize control valve 46. Thus, a desired setting for rock shaft 20 and draft arms 26 has been reached. Assuming that the electronic control circuit 62 is set for sensing changes in draft load, any movement of cross shaft or member 28 forwardly or rearwardly with respect to vehicle 10, which would be respectively produced by decreases and increases in draft load on draft arms 26, will result in a shifting of the associated plunger with respect to its coil and vary the output signal to electronic control circuit 62. This signal is combined with the two signals received from the remaining two sensing devices and makes a corresponding correction by actuating one of the solenoids cooperating with control valve 46.

The system of course, can also be adjusted so that the draft arms are held in a predetermined position with respect to vehicle 10 without regard to the actual load on the implement. This is accomplished by a setting within electronic control circuit 62 which would block out the signal from a sensing device associated with draft arms 26 and actuate control valve 46 only in response to changes in the position of manual control member 54 and rock shaft 20.

As can be seen from the above description, the unique sensing device can be rigidly constructed with a minimum number of parts and yet can accurately detect minor changes in the position of an associated member.

What is claimed is:

1. A draft sensing system on a vehicle having at least one draft arm, a first member movable with said at least one draft arm in response to changes in draft load, a rock shaft rotatable on said vehicle, said rock shaft being connected to said at least one draft arm for positioning said at least one draft arm with respect to the vehicle, a second member secured to said rock shaft for movement therewith and at least one sensing device cooperating with at least for sensing movement of said at least, said at least one sensing device including a housing having an elongated opening, a bracket secured to said housing and extending across said opening with said bracket having an aperture aligned with said opening and said opening having an enlarged portion adjacent said bracket, an annular variable inductance coil secured to said bracket and having a center opening aligned with said opening in said housing, a plunger slidable in said opening in said housing and said center opening in said coil, a cap secured to said housing and enclosing said coil and said bracket, and a spring encircling said plunger in said enlarged portion of said opening for forcing one end of said plunger into engagement with said at least one member so that said plunger is moved in response to movement of said at least one member to vary the inductance of said coil.

2. A draft sensing system as defined in claim 1, further including a resilient cover surrounding said plunger, said cover having a first connection with said housing, said first connection surrounding said opening, said cover having a second connection adjacent said one end of said plunger so that said cover protects a major portion of said plunger which is located outside of said housing.

3. A draft sensing system as defined in claim 1, in which said at least one member is said first member, and said first member is pivotally supported by links on said vehicle.

4. A draft sensing system as defined in claim 3, further including a second sensing device cooperating with said second member, said second sensing device including a second variable inductance coil fixed with respect to said vehicle and a second plunger moved in response to movement of said second member to vary the inductance of said second coil.

5. A draft sensing system as defined in claim 4, in which said second member is a cam rotated with said rock shaft and further including biasing means for forcing said second plunger into engagement with said cam.

6. A draft sensing system on a vehicle having at least one draft arm, a first member movable with said at least one draft arm in response to changes in draft load on said at least one draft arm, a rock shaft rotatable with respect to said vehicle and connected to said at least one draft arm for positioning said at least one draft arm on said vehicle, a second member movable with said rock shaft, hydraulic motor means connected to said rock shaft, solenoid operated valve means connected to said motor means, and circuit means for actuating said valve means, said circuit means including a first sensing device cooperating with said first member for indicating the position of said first member with respect to said vehicle and a second sensing device cooperating with said second member, each of said sensing devices including a housing fixed with respect to said vehicle and having an elongated opening with an enlarged portion at one end, a bracket secured to said housing and extending across said enlarged portion of said opening, a variable inductance coil supported by said bracket and having an opening aligned with said opening in said housing, a cap enclosing said coil and bracket and secured to said housing, a plunger movable with respect to said coil and slidably supported in said opening in said housing with a portion extending into said opening in said coil, said plunger having a free end portion extending beyond said housing and engaging one of said first and second members, a resilient cover surrounding said end portion of said plunger, and a spring encircling said plunger in said enlarged portion of said opening in said housing for causing said plunger to move with said one of said first and second members vary the inductance of said coil.

7. A draft sensing system as defined in claim 6, further including a manual control lever movable to set a desired setting for said at least one draft arm, a third member movable with said lever, said circuit means including a third sensing device cooperating with said third member, said third sensing device including a further housing fixed with respect to said vehicle, a further variable inductance coil in said further housing, an additional plunger movable with respect to said further variable inductance coil, and biasing means cooperating with said additional plunger for causing a free end of said further plunger to move with said third member.

* * * * *

UNITED STATES PATENT AND TRADEMARK OFFICE
CERTIFICATE OF CORRECTION

PATENT NO. : 3,994,348
DATED : November 30, 1976
INVENTOR(S) : Lewis G. Schowalter It is certified that error appears in the above-identified patent and that said Letters Patent are hereby corrected as shown below:

Claim 1, lines 12 and 13, "cooperating with at least for sensing movement of said at least," should read --cooperating with at least one of said members for sensing movement of said at least one of said members,--

Claim 6, line 36, insert --to-- before "vary".

Signed and Sealed this

Fifteenth Day of February 1977

[SEAL]

Attest:

RUTH C. MASON
*Attesting Officer*

C. MARSHALL DANN
*Commissioner of Patents and Trademarks*